United States Patent Office
3,239,517
Patented Mar. 8, 1966

3,239,517
PHENOTHIAZINES HAVING ANTIHYPERTENSIVE EFFECT
Lajos Toldy, 53 Villanyi ut., and Jozsef Borsi, 90 Bartok Bela ut., both of Budapest XI, Hungary, and Marton Fekete, 49 Fo utca, Budapest II, Hungary
No Drawing. Filed Oct. 12, 1964, Ser. No. 403,377
1 Claim. (Cl. 260—243)

The present application is a continuation-in-part of application Serial No. 232,324, filed October 5, 1962, now abandoned.

This invention relates to new phenothiazine derivatives having the general formula

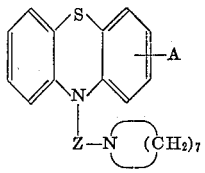
(I)

and therapeutically acceptable salts thereof, in which A is selected from the class consisting of hydrogen, chlorine and methoxy, and Z is a bivalent carbon chain having 2 to 7 carbon atoms.

The new phenothiazine derivatives having the general Formula I, as contrasted with the hitherto known phenothiazine derivatives, have almost no sedative or tranquilizing effect but rather show a strong hypotensive effect.

Thus, for example, 3-chloro-10-gamma-hepta-methyleneimino-propyl-phenothiazine causes hypotension for several hours on waking and sleeping animals in doses ranging from 0.1 to 0.5 mg./kg. of body weight. During the duration of the hypotensive effect, the hypertension caused by chemical agents such as adrenaline, nor-adrenaline, or vasopressine, or by pressing the carotid on both sides as well as by stimulating electrically the vasopressor zones of the hypothalmus, is strongly inhibited. By such investigations it has been established that in the case of the phenothiazine derivatives having the general Formula I, the sedative and the hypotensive effects can be separated, and the hypotensive effects can be produced without corresponding sedative or tranquilizing effects. Morevover, it has been established that in the case of prolonged treatment no increase in dosage is required by virtue of habituation.

These new compounds are advantageously used for therapeutic purposes in the form of their salts formed with nontoxic acids. Among such acids are maleic, fumaric, bezoic, ascorbic, succinic, bis-methylene-salicylic, methane-sulfonic, ethane-sulfonic, acetic, propionic, tartaric, salicylic, citric, theophylline-acetic, hydrochloric and phosphoric.

Several methods for producing compounds having the general Formula I are as follows:

(1) A heterocyclic compound having the formula

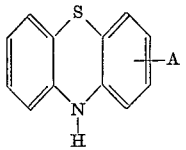
(II)

is condensed with a compound selected from the class consisting of amines and their salts. In the above formula, A is selected from the class consisting of hydrogen, chlorine and methoxy. Among the amines, those represented by the formula

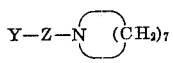
(III)

and its salts may be used, where Z is as above and Y is a reactive ester residue such as a halogen atom, a sulfuric-acid ester, or an aliphatic or aromatic sulfonic-acid ester residue.

(2) A heterocylic compound having the formula

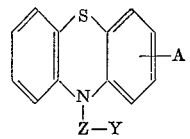
(IV)

in which A, Z and Y have the above meanings, is condensed with an amine having the formula

(V)

(3) A heterocyclic compound having the formula

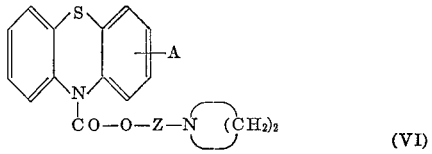
(VI)

is heated at a temperature exceeding 100° C. A and Z have the above meanings.

The products of the processes described above can be transformed to salts by treating with a mineral or organic acid, or they can be quaternized in a way known per se, as by treating with an alkyl halide or alkyl sulfonate.

Quaternary derivatives of the new compounds having the general Formula I can also be prepared by reacting a heterocyclic compound of Formula IV with an amine having the formula

(VII)

in which R is selected from the class consisting of alkyl, aralkyl, and substituted aralkyl groups.

Reaction 1 described above can be carried out in a solvent or not, and with or without a condensing agent. As solvents, aromatic hydrocarbons such as toluene or xylene, esters such as ethyl acetate, or tertiary amides such as dimethyl formamide can be used. If a condensing agent is employed, as is preferable, alkali metals can be used, or there may be used alkali-metal derivatives such as hydrides, amides, hydroxides, alcoholates, or alkyl or aryl derivatives. Among the desirable condensing agents are metallic sodium or potassium, sodium amide, finely divided sodium or potassium hydroxide, lithium or sodium hydride, sodium tertiary butylate, butyl lithium, phenyl lithium or phenyl sodium. It is preferable to carry out the condensation reaction at the boiling temperature of the solvent.

Reaction 2 can be carried out either at room temperature or at elevated temperature. The condensation can be carried out in the presence of an inert solvent such as an aromatic hydrocarbon or an alcohol or the like. Acid-binding agents can also be used, if desired; and the excess of the amine having the general Formula V can also be used as the acid-binding agent.

Reaction 3 is preferably carried out at temperatures between 150 to 200° C. Heating should be continued until the evolution of carbon dioxide ceases. This process can be carried out without a solvent or in an inert diluent such as biphenyl, diphenyl oxide, chlorinated aromatic hydrocarbons, or a standard diluent for decarboxylating reactions, such as quinoline or other weak organic bases.

To enable those skilled in the art to practice this invention, the following illustrative examples are given:

Example 1

26 g. of 3-chlorophenothiazine (Beilstein's nomenclature) are boiled for 2 hours with 7 g. of sodium amide in 200 ml. of absolute xylene. Then, with further boiling and mixing, over a period of one and one-half hours, a solution of 26 g. of N-(3-chloropropyl)-heptamethyleneimine in 50 ml. of absolute xylene is added dropwise. After boiling for 2 hours, the cooled mixture is vacuum filtered, washed with 200 ml. of water, and then agitated with 300 ml. of 2 N hydrochloric acid. At this time the hydrochloric acid salt of 3-chloro-10-(3'-heptamethyleneimino)-propylphenothiazine, which has low solubility in water, is precipitated. The aqueous portion is separated from the decanted liquid mixture, and after the above precipitation it is rendered basic with a 10 N sodium-hydroxide solution. The free base is extracted with benzene and distilled off. Boiling point: 250–255° C. at 0.5 mm. Hg. Yield: 26 g. of 3-chloro-10-(3'-heptamethyleneimino)-propyl-phenothiazine. The ethane sulfonate precipitated from the methyl-ketonic solution of the product melts at 150–152° C. The N-(3-chloropropyl)-heptamethyleneimine used as starting material is prepared by reacting 1-chloro-3-bromo-tropeine with heptamethyleneimine.

Boiling point at 0.4 mm. Hg, 82–84° C.

Example 2

18 g. of 3-chloro-10-(3'-mesyloxy)-propyl-phenothiazine (L. Toldy, I. Fabricius, Chem. and Ind., 1957, 665) are shaken in 300 ml. of absolute alcohol with 12 g. of heptamethyleneimine until dissolution, then the solution is left to stand for a week, thereafter the alcohol is distilled off and the residue taken up with chloroform. The chloroformous solution is shaken out at first with a 5 N sodium-hydroxide solution, then the 3-chloro-10-(3'-heptamethyleneimino)-propyl-phenothiazine is extracted with the method described in Example 1, and also further on the method described in Example 1 is followed. After precipitation from an alcoholous solution, the fumarate of the obtained 3-chloro-10-(3'-heptamethyleneimino)-propyl-phenothiazine melts at 140–150° C.

Example 3

8 g. of 3-chloro-10-(3'-heptamethyleneimino)-propyl-phenothiazine are dissolved in 16 ml. of acetone and mixed with 10 ml. of methyl iodide. The exothermic reaction is moderated by cooling and the mixture is maintained at +20–25° C. Then it is left to stand for a night at room temperature. Thereafter the solution is diluted with benzene, whereby an oily substance is separated which recrystallizes while standing. The obtained product is vacuum filtered and washed with benzene. Yield: 10 g. of 3-chloro-10-(3'-heptamethyleneimino)-propyl-phenothiazine-methoiodide. M.P.: 110–112° C. with decomposition.

Example 4

15 g. of phenothiazine are boiled for 1 hour with 4.5 g. of sodium amide in 150 ml. of xylene, then with further boiling and stirring, the solution of 18 g. of N-(3-chloropropyl)-heptamethyleneimine in 50 ml. of absolute xylene is added dropwise. After boiling for 2 hours, the cooled mixture is vacuum filtered, agitated with water two times and extracted with 250 ml. of 15% tartaric acid solution. The separated aqueous phase is rendered basic with a 10 N sodium hydroxide solution, the separated-out oil is absorbed with benzene, and after distilling off the benzene, the oil is distilled off.

Boiling point at 0.4 mm. Hg, 235° C. Yield: 20 g.

The ethane sulfonate precipitated in methylethylketone from the product 10-(3'-heptamethyleneimino)-propyl-phenothiazine melts at 140–142° C.

Example 5

10 g. of phenothiazine are boiled with 3 g. of sodium amide for half an hour in 100 ml. absolute xylene, then during 1 hour the solution in 50 ml. of absolute xylene of 10 g. of N-(2-chloroethyl)-heptamethyleneimine is added dropwise. After postboiling for 1 hour, the cooled mixture is vacuum filtered, agitated with water two times and extracted with 200 ml. of a 15% aqueous tartaric-acid solution. Boiling point: 245–250° C. at 0.6 mm. Hg. Yield: 13 g. of 10-(2-heptamethyleneimino)-ethyl-phenothiazine. The ethane sulfonate of the product melts at 124–125° C.

The N-(2-chloroethyl)-heptamethyleneimine used as starting material is prepared by synthesizing N-(2-oxyethyl)-heptamethyleneimine (boiling point: 100–105° C. at 5 mm. Hg) by reacting heptamethyleneimine with ethyleneoxide and this product is chlorinated with thionyl chloride, thereby obtaining the desired product the chlorohydrate of which melts at 196–197° C.

Example 6

7.3 g. of 10 - (2' - tosyloxy) - propyl - phenothiazine are boiled for 8 hours with 9 g. of heptamethyleneimine in 100 ml. of absolute xylene. Thereafter the cooled mixture is agitated with water two times, then extracted with a 15% aqueous tartaric-acid solution. The oil separating out from the boiled aqueous phase is taken up with benzene and it is distilled off.

The ethane sulfonate of the product 10-(2'-heptamethyleneimino) - propyl - phenothiazine melts at 143–145° C.

Example 7

22.3 g. of 3-methoxy-phenothiazine are boiled for one and a half hours with 4.8 g. of sodium amide in 200 ml. of absolute xylene. Then while further boiling and stirring, 22 g. of N-(3-chloro-propyl)-heptamethyleneimine dissolved in 50 ml. of absolute xylene are added dropwise during one hour. After postboiling for one hour the cooled mixture is vacuum filtered, washed twice with water and extracted with 200 mm. of a 15% aqueous tartaric-acid solution. The aqueous phase is rendered basic with a 10 N sodium hydroxide solution and the separated oil is absorbed with benzene. After distilling off the benzene the oil is distilled off. A product of 3-methoxy - 10 - (3'-heptamethyleneimino)-propyl-phenothiazine is obtained. Boiling point: 250–260° C. at 0.4 mm. Hg.

In the above examples, in which the N-(2-chloroethyl)-heptamethyleneimine and N - (3 - chloropropyl) - heptamethyleneimine is added, corresponding results are obtained by utilizing instead the homologous haloalkyl heptamethyleneimines comprising the butyl, isobutyl, pentyl, hexyl, isopentyl, isohexyl, hepta and isohepta compounds.

The tranqualizing or sedative effects of 3-chloro-10-(gamma - heptamethyleneimino-propyl) - phenothiazine fumarate (hereinafter called "hepta") were compared with 3 - chloro-10-(gamma-hexamethyleneimino-propyl)-phenothiazine fumarate (hereinafter called "hexa"), on mice, by the aid of the method of P. B. Dews (British J. Pharmacol. 8, 46/153), taking into account a modification elaborated by the inventors (Borsy et al., Arch. Int. Pharmacodyn., 124, 180/1960). The results are reported below.

The hexa compound had a base content of 76% while the hepta compound had a base content of 78%. The 50% orientation reflex-inhibiting dosages, as compared with that of chloropromazine as a standard, are given in the table below, in units of an effective dose of 50 mm./kg. of body weight, administered intraperitoneally.

Chloropromazine _____ 1.5
Hexa _____ 1.7
Hepta _____ 7.0

From the above table, it will be recognized that the hexa compound and chloropromazine are about on the same level with regard to producing tranquilizing or sedative effects, but that the hepta compound is four or five times weaker in this regard than either chloropromazine or the hexa compound. In other words, much more of the hepta compound can be administered without producing tranquilizing or sedative effects, so that the hypotensive effects of the hepta compound are, for all practical purposes, divorced from the sedative or tranquilizing effects that characterize previously known compounds of this group.

What we claim is:

A phenothiazine derivative selected from the class consisting of

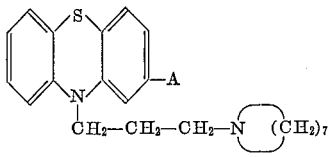

and therapeutically acceptable salts thereof, wherein A is selected from the class consisting of hydrogen, chlorine and methoxy.

References Cited by the Examiner

UNITED STATES PATENTS 3,006,913   10/1961   Mull _____ 260—239

FOREIGN PATENTS 813,861   5/1959   Great Britain.
828,495   2/1960   Great Britain.
831,091   3/1960   Great Britain.
845,943   8/1960   Great Britain.

OTHER REFERENCES

Chemical Abstracts, volume 59, column 2809 (1963) (abstract of Pai et al., Hau Hseuh Hsueh Pao, volume 29, pages 28–36) (1963).

Craig et al.: J. Org. Chem., volume 26, pages 135–138 (January 1961)

Hollister: Ann. of Internal Medicine, volume 51, page 1041 (1959).

Villani et al.: J. Med. and Pharm. Chem., volume 5, pages 373–374 (March 1962).

WALTER A. MODANCE, *Primary Examiner.*

JOHN D. RANDOLPH, *Examiner.*